US008160775B2

(12) United States Patent
Kitazaki et al.

(10) Patent No.: US 8,160,775 B2
(45) Date of Patent: Apr. 17, 2012

(54) WHEEL ATTITUDE CONTROL METHOD AND WHEEL ATTITUDE CONTROL DEVICE

(75) Inventors: Tsuyoshi Kitazaki, Hiratsuka (JP); Jun Matsuda, Hiratsuka (JP); Naoshi Miyashita, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 371 days.

(21) Appl. No.: 12/336,322

(22) Filed: Dec. 16, 2008

(65) Prior Publication Data

US 2009/0171531 A1 Jul. 2, 2009

(30) Foreign Application Priority Data

Dec. 26, 2007 (JP) ................. 2007-334357

(51) Int. Cl.
*B62D 17/00* (2006.01)
*G06F 17/00* (2006.01)
(52) U.S. Cl. ........................ 701/37; 280/5.52
(58) Field of Classification Search .................. 701/37, 701/70, 79, 29; 73/146, 488; 280/5.5; 152/151, 152/209.1
See application file for complete search history.

(56) References Cited

U.S. PATENT DOCUMENTS

| 4,835,714 | A * | 5/1989 | Sano et al. ..................... 700/279 |
| 6,386,553 | B2 | 5/2002 | Zetterstrom |
| 6,539,295 | B1 | 3/2003 | Katzen et al. |
| 7,146,853 | B2 * | 12/2006 | Fischer et al. .................. 73/146 |
| 7,568,384 | B2 * | 8/2009 | Morinaga ........................ 73/146 |
| 7,693,626 | B2 * | 4/2010 | Breed et al. ..................... 701/29 |
| 7,957,879 | B2 * | 6/2011 | Kitazaki et al. ................. 701/82 |
| 2002/0036385 | A1 | 3/2002 | Mackle et al. |
| 2003/0111812 | A1 | 6/2003 | Carlstedt et al. |
| 2005/0234613 | A1 * | 10/2005 | Brusarosco et al. ............ 701/29 |
| 2006/0201240 | A1 * | 9/2006 | Morinaga ........................ 73/146 |
| 2007/0171034 | A1 * | 7/2007 | Mancosu et al. ............... 340/438 |
| 2007/0240502 | A1 | 10/2007 | Morinaga et al. |
| 2008/0114520 | A1 | 5/2008 | Kitazaki |
| 2008/0162009 | A1 | 7/2008 | Miki et al. |
| 2009/0049903 | A1 * | 2/2009 | Murakami et al. .............. 73/146 |
| 2009/0055040 | A1 * | 2/2009 | Nagaya ........................... 701/29 |

FOREIGN PATENT DOCUMENTS

EP 887211 A1 * 12/1998

(Continued)

OTHER PUBLICATIONS

Notifications of Reasons for Refusal, dated Jun. 30, 2009.

(Continued)

*Primary Examiner* — Thomas Black
*Assistant Examiner* — Sara Lewandroski
(74) *Attorney, Agent, or Firm* — Knobbe Martens Olson & Bear LLP

(57) ABSTRACT

A wheel attitude control method of the invention comprises the steps of: chronologically obtaining acceleration data in a radial direction of a tire at a center position of a tire tread and at an off-center position spaced apart from the center position toward a shoulder; obtaining respective contact lengths at the center position and the off-center position from the acceleration data; and controlling a wheel attitude, which varies in accordance with changes in a load applied to the wheel when the braking force is imparted to the wheel, based on the obtained contact length at the center position and the obtained contact length at the off-center position.

4 Claims, 6 Drawing Sheets

FOREIGN PATENT DOCUMENTS

| | | |
|---|---|---|
| EP | 1 930 187 A1 | 6/2008 |
| EP | 2 012 106 A1 | 1/2009 |
| JP | 2005-343281 | 12/2005 |
| JP | 2006256503 A | 9/2006 |
| JP | 2006-327571 | 12/2006 |
| JP | 2007-91183 | 4/2007 |
| WO | WO 90/05646 A | 5/1990 |
| WO | WO 01/08908 A1 | 2/2001 |
| WO | WO 03/082644 A | 10/2003 |
| WO | WO 2007/040115 | 4/2007 |
| WO | WO 2007/123196 | 11/2007 |

OTHER PUBLICATIONS

European Search Report, dated Apr. 1, 2009.

* cited by examiner

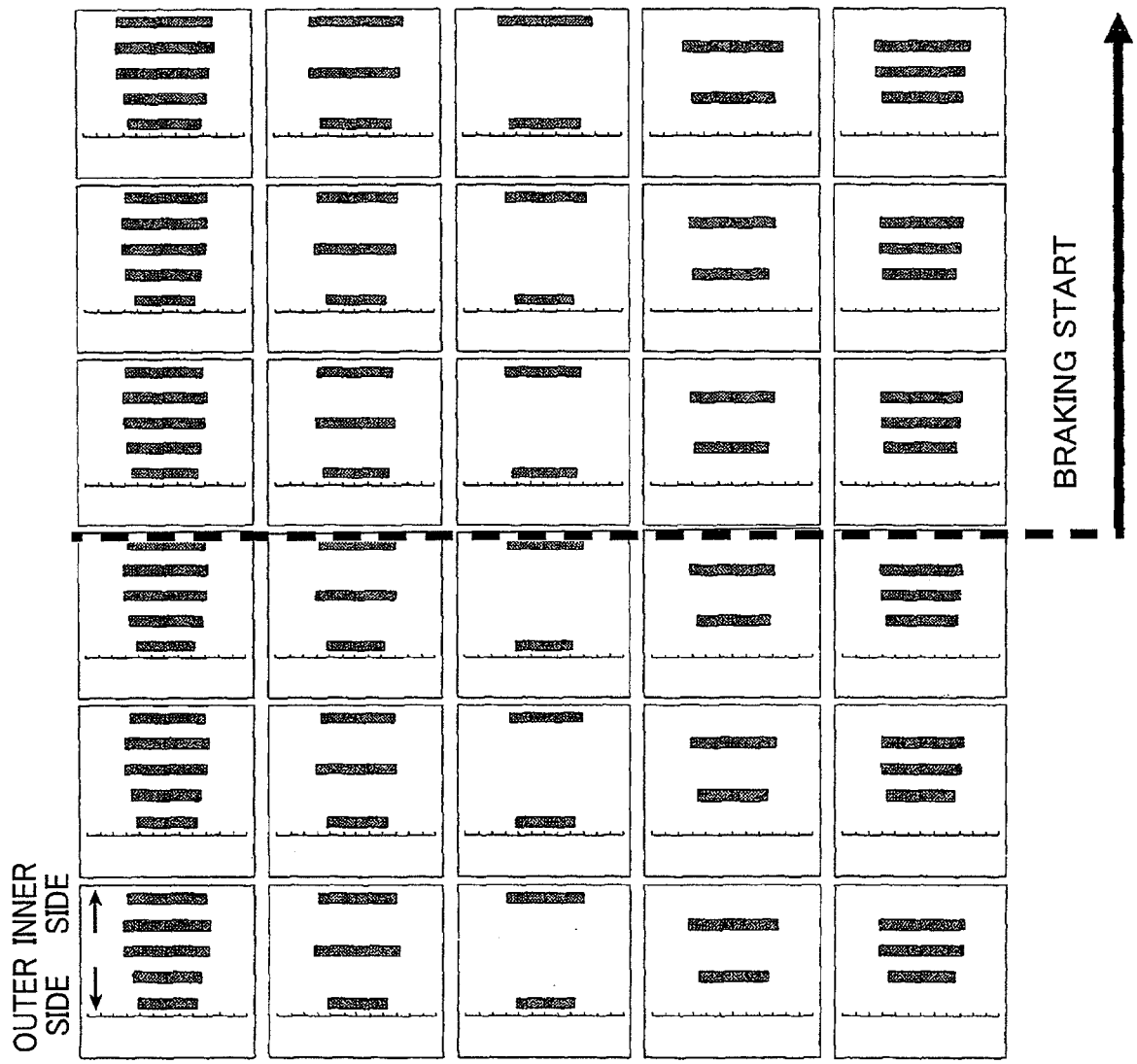

WHEEL ATTITUDE CONTROL METHOD AND WHEEL ATTITUDE CONTROL DEVICE

The entire contents of a document cited in this specification are incorporated herein by reference.

BACKGROUND OF THE INVENTION

The present invention relates to a wheel attitude control method for controlling wheel attitude when braking a vehicle by imparting a braking force to wheels attached to a vehicle and a wheel attitude control device using the method.

When braking a vehicle by imparting a braking force to wheels, each of front wheels undergoes an increase in load due to this braking, and a camber angle and a toe angle indicating wheel attitude are changed. This change depends upon a wheel mounting link mechanism for wheel attachment. Generally speaking, in a case of a high load, a toe-out state tends to occur in which the wheels are widened outwardly with respect to a vehicle advancing direction, with the wheel being in a negative camber state in which the wheel is inclined toward an inner side of the wheel with respect to a direction perpendicular to the contact patch.

When the vehicle is thus braked, the tire attitude is changed, and hence a shape of the contact patch where the tire is in contact with a road surface is deviated from the symmetrical shape, which exerts high braking force. As a result, there arises a problem in that it is impossible to maintain a high braking force.

JP 2005-343281 A discloses a method of and an apparatus for estimating tire dynamic state and a tire with sensors.

According to the above-mentioned publication, using a center position of a tire tread as a reference, strain gauges are mounted at two symmetrical positions in a tire width direction, and a contact length is obtained from an output waveform of the strain gauge, the load, lateral force, and longitudinal force being estimated from the obtained contact length.

SUMMARY OF THE INVENTION

However, in the method in which strain gauges are mounted at two symmetrical positions, using the tire tread center position as a reference, it is impossible to accurately ascertain the shape change in the contact length, which depends upon the wheel link mechanism.

It is an object of the present invention to provide a wheel attitude control method which makes it possible to control wheel attitude according to current wheel attitude when braking a vehicle by imparting a braking force to wheels attached to the vehicle and a wheel attitude control device using this method.

A first aspect of the invention to achieve the above first object is to provide a wheel attitude control method for controlling an attitude of a wheel when braking a vehicle by imparting a braking force to the wheel attached to the vehicle, the method comprising the steps of: chronologically obtaining acceleration data in a radial direction of a tire at a center position of a tire tread and at an off-center position spaced apart from the center position toward a shoulder; obtaining respective contact lengths at the center position and the off-center position from the acceleration data; and controlling a wheel attitude, which varies in accordance with changes in a load applied to the wheel when the braking force is imparted to the wheel, based on the obtained contact length at the center position and the obtained contact length at the off-center position.

Here, the center position of the tire tread refers to a position on the tire circumference at which the tread part intersects with a plane supposedly provided perpendicularly to a rotation center axis of the tire to be line-symmetric.

Preferably, the off-center position is spaced apart from the center position toward the shoulder on a vehicle inner side of the tire.

Preferably, a difference between the contact length at the center position and the contact length at the off-center position is compared with a pre-set first threshold value, in the wheel attitude controlling step, to control the wheel attitude in accordance with a result of the comparison. Further, a camber angle or a toe angle of the wheel is preferably controlled when the difference exceeds the first threshold value.

Preferably, a ratio of the contact length at the center position to the contact length at the off-center position is compared with a pre-set second threshold value, in the wheel attitude controlling step, to control the wheel attitude in accordance with a result of the comparison. In this case, a camber angle or a toe angle of the wheel is preferably controlled when the ratio exceeds the second threshold value.

Preferably, the off-center position is situated within a range of 25% of a tire contact width as measured from a contact width end in a tire width direction. Here, the width direction of the tire refers to the axis direction of the rotation center axis of the tire.

A second aspect of the invention to achieve the above first object is to provide a wheel attitude control device for controlling an attitude of a wheel when braking a vehicle by imparting a braking force to the wheel attached to the vehicle, the device comprising: acceleration data obtaining means for chronologically obtaining acceleration data in a radial direction of a tire at a center position of a tire tread and at an off-center position spaced apart from the center position toward a shoulder; contact length obtaining means for obtaining respective contact lengths at the center position and the off-center position from the acceleration data; and control signal generating means for generating a control signal for controlling the wheel attitude, which varies in accordance with changes in a load applied to the wheel when the braking force is imparted to the wheel, based on the obtained contact length at the center position and the obtained contact length at the off-center position.

According to the present invention, when braking a vehicle by imparting a braking force thereto, respectively obtained are the contact length at the center position of the tire tread and the contact length at an off-center position spaced apart from the center position to the shoulder side, and the wheel attitude is controlled on the basis of the contact length at the center position and the contact length at the off-center position thus obtained, and hence it is possible to control this attitude efficiently in accordance with the current wheel attitude.

BRIEF DESCRIPTION OF THE DRAWINGS

In the accompanying drawings:

FIGS. 5A through 5E are diagrams showing how the contact length of a tire changes when a braking force is applied to the tire;

DESCRIPTION OF THE PREFERRED EMBODIMENTS

In the following, a wheel attitude control method and a wheel attitude control device according to an embodiment of the present invention are described in detail with reference to the accompanying drawings.

Figure 1:
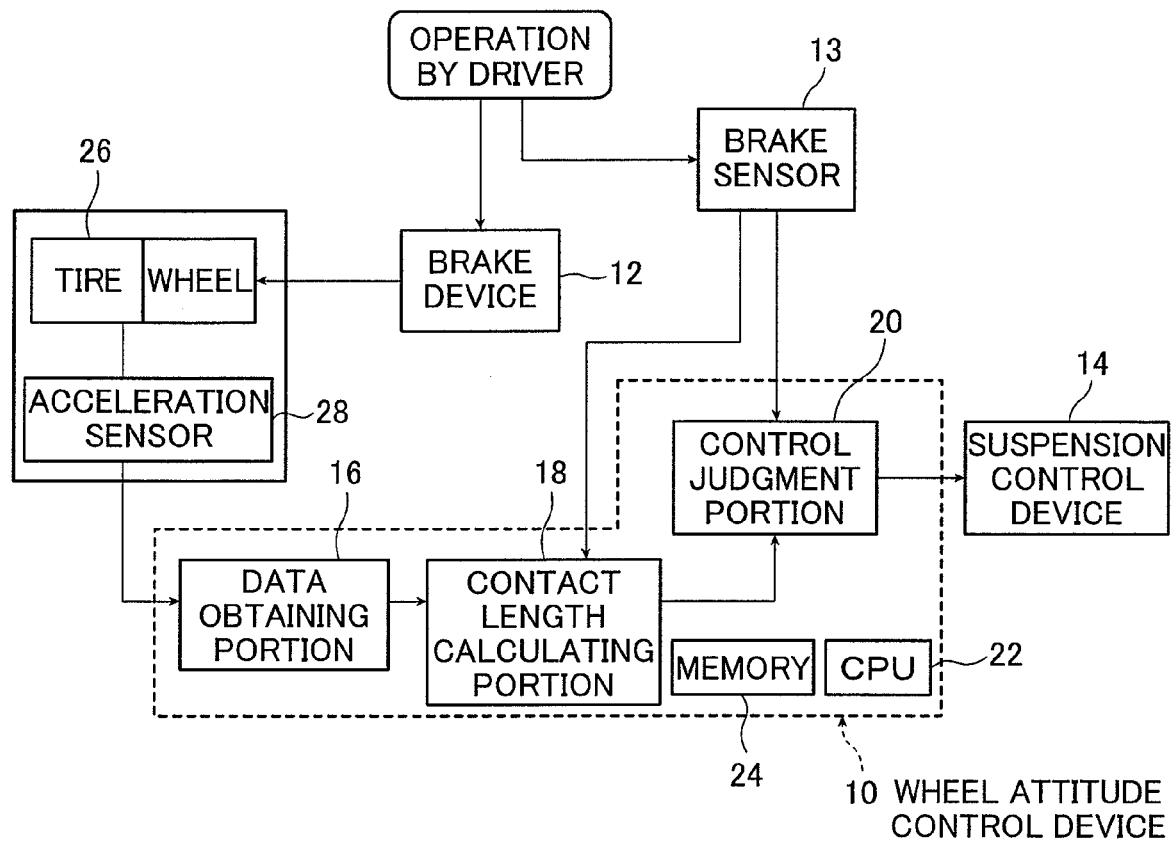
FIG. 1 is a diagram showing a construction of a wheel attitude control device according to an embodiment of the present invention.

FIG. 1 is a diagram showing a construction of a wheel attitude control device according to an embodiment for executing the wheel attitude control method of the present invention.

A wheel attitude control device 10 shown in FIG. 1 transmits a control signal to a suspension control device 14 on the basis of a change in a contact patch shape of a tire generated when the driver presses the brake pedal and a braking force is imparted to a wheel with a tire attached thereto by a brake device 12. Note that the present invention is described with respect to a front tire, which greatly influences the braking of the vehicle.

The wheel attitude control device 10 is mainly provided with a data obtaining portion 16, a contact length calculating portion 18 and a control judgment portion 20, and it is further provided with a CPU 22 for controlling the operation and the functions of the data obtaining portion 16, the contact length calculating portion 18 and the control judgment portion 20, and a memory 24 for storing conditions such as threshold values for various portions and data calculated in the various portions.

The data obtaining portion 16 obtains an acceleration signal output from an acceleration sensor 28 mounted to a tire 26. The acceleration sensor 28 can detect the acceleration in the radial direction R, and a semiconductor acceleration sensor, for example, is used as the acceleration sensor.

More specifically, the semiconductor acceleration sensor has an Si wafer with a diaphragm formed in an outer peripheral frame portion thereof, and a pedestal for fixing this wafer outer peripheral frame portion in position. At the center of one surface of the diaphragm, there is provided a dead weight, and a plurality of piezoresistors are formed on the diaphragm. When acceleration is applied to this semiconductor acceleration sensor, the diaphragm is deformed, and the resistance value of the piezoresistors changes due to this deformation. A bridge circuit is formed so that this change can be detected as acceleration information.

The acceleration sensor 28 is not restricted to a semiconductor acceleration sensor, and any type of acceleration sensor can be used as long as it detects the acceleration in the radial direction R of the tire 26.

Figure 2:
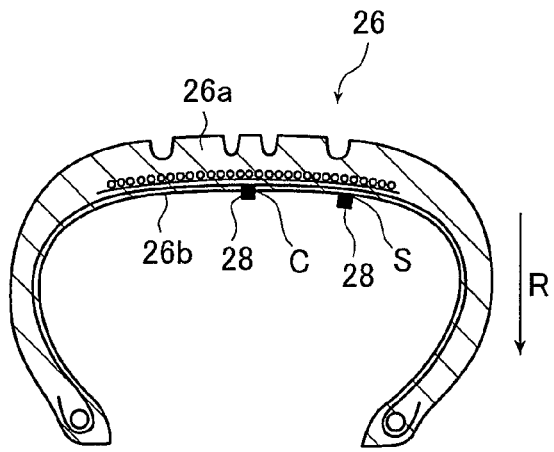
FIG. 2 is a diagram illustrating a mounting position of an acceleration sensor used to obtain acceleration data to be obtained in the wheel attitude control device of the present invention.

As shown in FIG. 2, two such acceleration sensors 28 are provided on an inner liner portion 26b facing a hollow region of the tire, respectively at a center position C of a tire tread 26a and an off-center position S spaced apart from the center position to the shoulder side. Such arrangement makes it possible to measure the acceleration in the radial direction R of the tire. Here, it is desirable for the off-center position S to be situated at a position within 25% of the tire contact width as measured from a tire contact width end. Here, the tire contact width refers to the contact width under the load applied to the tire when the vehicle has passengers to its capacity and under the recommended tire inflation pressure for the vehicle.

Measurement signals output from the acceleration sensors 28 are supplied to the data obtaining portion 16. The data obtaining portion 16 is provided with an amplifier (not shown) for amplifying the measurement signals of the acceleration in the radial direction R supplied from the acceleration sensors 28, and an A/D conversion circuit (not shown) for performing sampling on the measurement signals, which are analog data, with a predetermined sampling frequency to convert it to digital data. The data obtaining portion 16 supplies the acceleration data converted to digital data to the contact length calculating portion 18.

The contact length calculating portion 18 is a portion in which the calculation of the contact length is triggered by the detection signal supplied from a brake sensor 13 to the control judgment portion 20. Here, the brake sensor 13 detects the brake pedal being pressed by the driver. The contact length calculating portion 18 performs a smoothening using a filter on the supplied acceleration data to remove noise component to thereby obtain smoothly changing acceleration data, and calculates the contact length by using this acceleration data.

As the filter for the smoothening, used is, for example, a digital filter that uses a predetermined frequency as a cutoff frequency. The cutoff frequency varies according to the rotating speed or the noise component. For example, when the wheel speed is 60 (km/h), the cutoff frequency is 0.5 to 2 (kHz). Apart from this, it is also possible to perform the smoothening by using moving average processing, a trend model or the like instead of the digital filter.

Figure 3A:
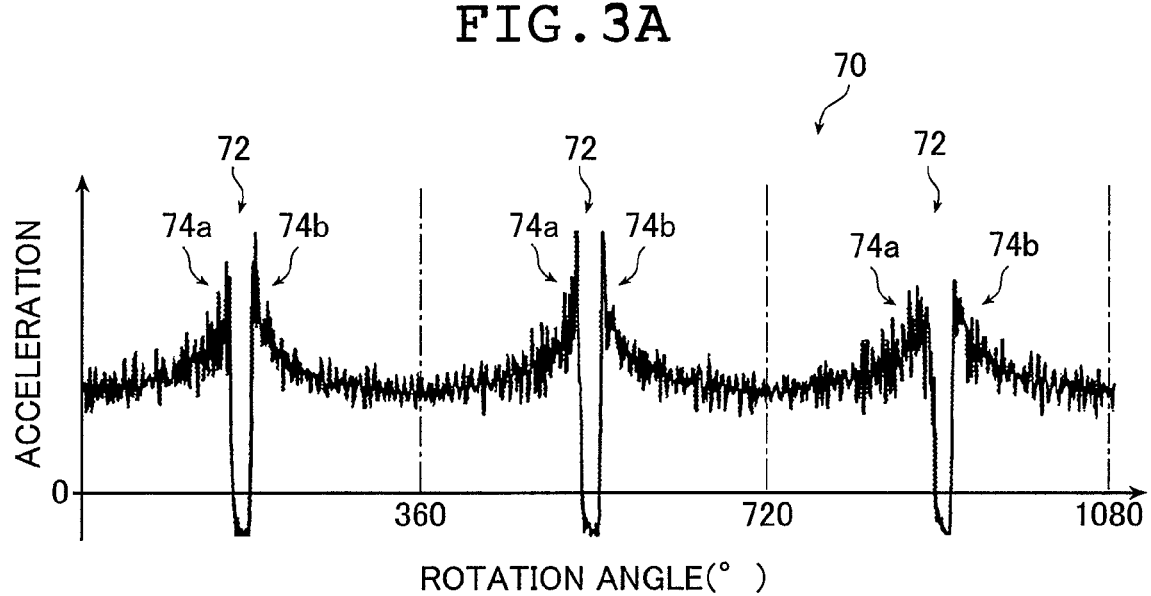
FIGS. 3A and 3B are diagrams showing an example of acceleration data obtained in the wheel attitude control device of the present invention, respectively.
Figure 3B:
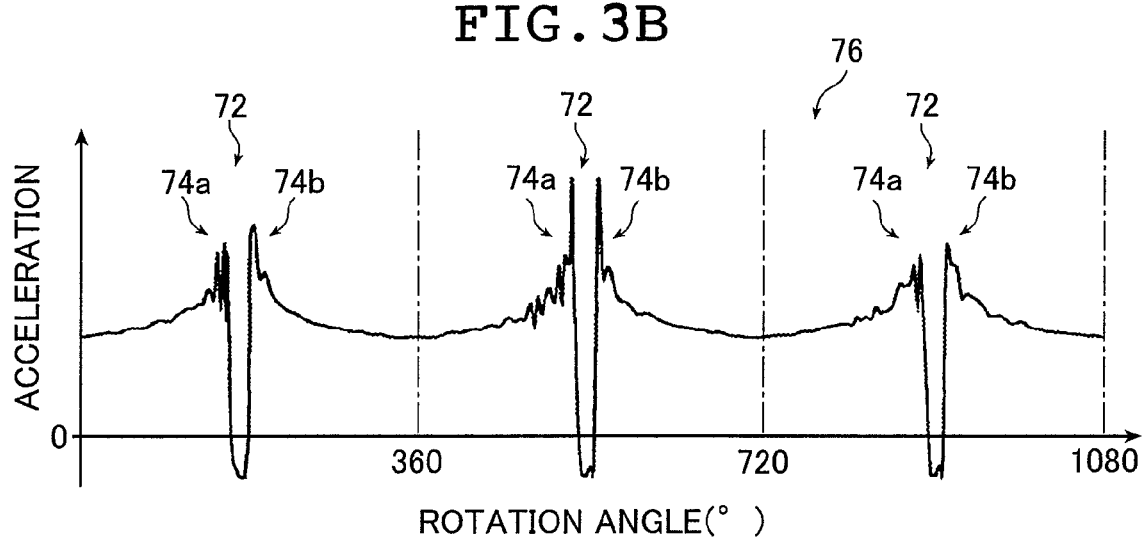

FIG. 3A shows an example of acceleration data 70 prior to the smoothening, and FIG. 3B shows an example of acceleration data 76 after the smoothening.

Here, as shown in FIGS. 3A and 3B, during one rotation of the wheel (rotation angle: 360 degrees), that is, in one interval 72, there are generated regions 74a and 74b where the acceleration greatly changes due to deformation of a contact patch of the tire. This is due to the fact that when the tire tread rotates to enter the contact area, the centrifugal force acceleration component due to the tire rotation changes abruptly, and that also when the tire tread leaves the contact area, the centrifugal force acceleration component due to tire rotation changes abruptly. Thus, in the acceleration data 76, a region 74a where an abrupt change occurs may be called a contact front-end region, and a region 74b where an abrupt change occurs may be called a contact back-end region.

Figure 4:
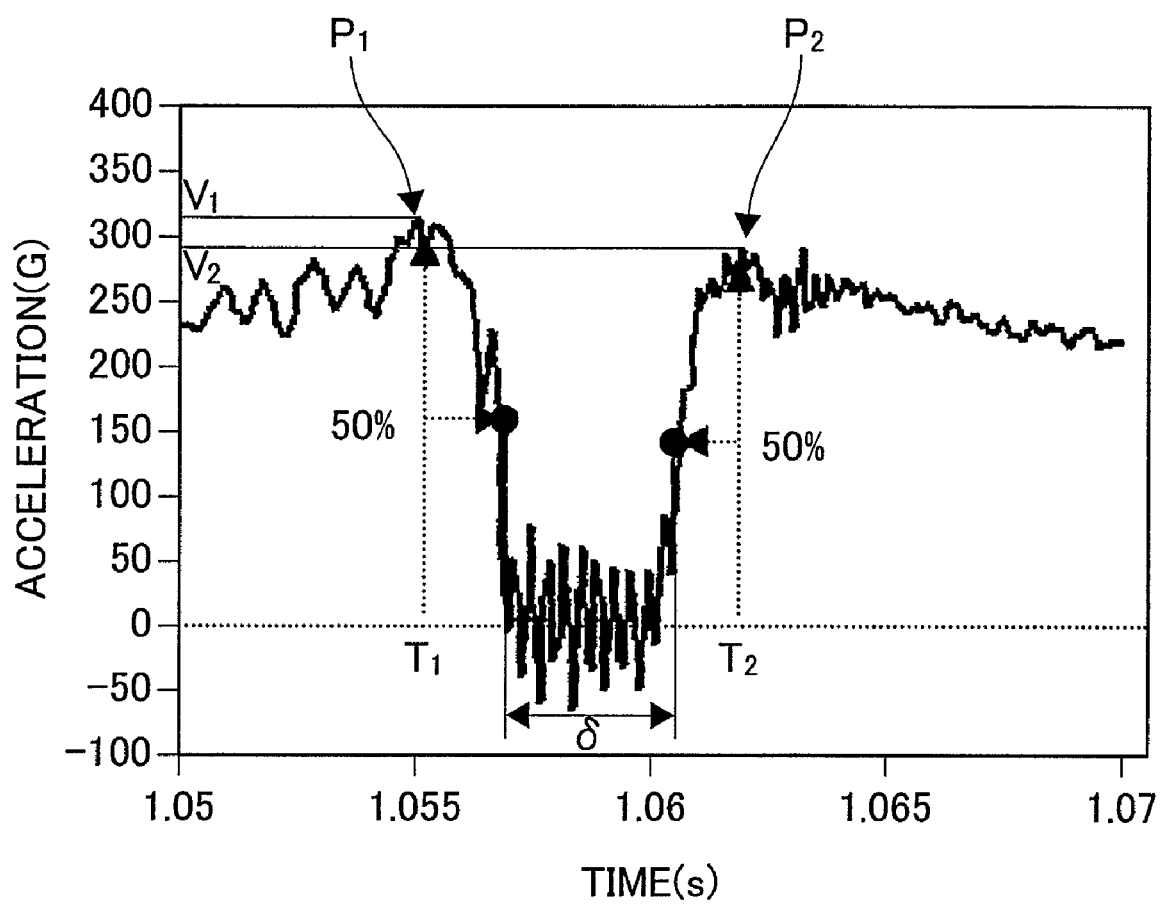
FIG. 4 is a diagram illustrating a method of calculating contact length in the wheel attitude control method of the present invention.

FIG. 4 shows an example of acceleration data different from that of FIGS. 3A and 3B.

As shown in FIG. 4, in a contact front-end region where the tire tread begins to contact, generated is a leading edge peak $P_1$ due to deformation of the tire, and, in a contact back-end region where the tire tread leaves the contact area, generated is a trailing edge peak $P_2$ due to deformation at the time of releasing of the tire tread from the contact state.

In these regions where the acceleration is greatly changed, the contact length calculating portion 18 detects the value of the leading edge peak $P_1$, position (timing) of the leading edge peak $P_1$, the value of the trailing edge peak $P_2$, and position (timing) of the trailing edge peak $P_2$.

The position of the leading edge peak $P_1$ refers to the timing with which the leading edge peak $P_1$ is generated during one rotation of the tire. The position of the trailing edge peak $P_2$ refers to the timing with which the trailing edge peak $P_2$ is generated during one rotation of the tire.

In this embodiment, the portion where the acceleration first attains its maximum level during one rotation of the wheel (interval 72) is referred to as the leading edge peak $P_1$. Then, the value of this portion where the acceleration first attains its maximum level is referred to as the value $V_1$ of the leading edge peak $P_1$. Further, the timing with which the leading edge peak $P_1$ is generated is referred to as a first timing $T_1$.

After the leading edge peak $P_1$, from a temporary reduction in the value of the acceleration onward, the acceleration again attains another maximum value. This portion is referred to as a trailing edge peak $P_2$, and the value of the portion where the acceleration attains another maximum value again is referred to as the value $V_2$ Of the trailing edge peak $P_2$. The timing with which the trailing edge peak $P_2$ is generated is referred to as a second timing $T_2$.

In this way, the change in the value of the acceleration during one rotation of the wheel is examined, and the values corresponding to the leading edge peak $P_1$ and the trailing edge $P_2$ are called the leading edge peak value $V_1$ and the trailing edge peak value $V_2$, respectively, with the values being stored in the memory 24. Further, the first timing $T_1$ of the leading edge peak $P_1$ and the second timing $T_2$ Of the trailing edge peak $P_2$ are also stored in the memory 24.

In the contact length calculating portion 18, the leading edge peak value $V_1$ and the trailing edge peak value $V_2$ are used as reference, and a value corresponding to 50% of the leading edge peak value $V_1$ is regarded as first predetermined value while a value corresponding to 50% of the trailing edge peak value $V_2$ is regarded as second predetermined value. A time interval δ, which is the difference between the time to pass the first predetermined value downwardly from above and the time to pass the second predetermined value upwardly from below on the acceleration data is obtained as the contact time, and the vehicle traveling speed obtained from a wheel speed sensor (not shown) provided in the vicinity of a hub to which a wheel is attached is multiplied by the time interval δ, whereby the contact length is obtained. Supplied to the contact length calculating portion 18 are acceleration data at the center position C of the tire tread and acceleration data at the off-center position S, and hence there are calculated the contact length at the center position C and the contact length at the off-center position S. The calculation of the contact length in the contact length calculating portion 18 is triggered by a detection signal from the brake sensor 13, and information on the contact lengths at the center position C and the off-center position S is constantly supplied to the control judgment portion 20.

While the time interval δ for calculating the contact length was obtained having first and second predetermined values corresponding to 50% of the leading edge peak value $V_1$ and the trailing edge peak value $V_2$, respectively, the percentage is not restricted to 50%, and it is also possible to adopt a value within the range of 10% to 100%.

The control judgment portion 20 calculates the difference in contact length between the center position C and the off-center position S, generates a control signal designating a wheel attitude control for a suspension control device 14 when it is determined that the difference is in excess of a pre-set first threshold value, and transmits the control signal to the suspension control device 14. The above-mentioned operation of the control judgment portion 20 is triggered by a detection signal supplied from the brake sensor 13 to the control judgment portion 20.

Further, the control judgment portion 20 makes a judgment as to whether the wheel is in a rotation or non-rotation state on the basis of a pulse signal supplied from a wheel speed sensor (not shown). The suspension control device 14 is a portion that adjusts the length, etc. of constituent members of a suspension by means of an actuator and the like to control the camber angle or the toe angle of the wheel.

FIG. 5A shows chronological changes in contact length in three regions each defined between longitudinal grooves of the tire tread shown in FIG. 2 and in the regions at both ends outside the three regions. Those contact lengths are obtained from acceleration data based on measurement performed using the acceleration sensors 28 which are attached to the three regions defined by the longitudinal grooves of the tire tread and to the regions outside thereof. The contact lengths on the right and left outer sides are those of regions within a range of 25% of the tire contact width as measured from the contact ends in the width direction. The drawing shows, from the left to the right, the chronological contact length distributions per tire rotation. Upon the fourth rotation of the tire, the brake device 12 operates, and braking is started.

As can be seen from the drawing, in the fourth to sixth contact length distributions as measured from the left, the contact lengths on the inner and outer sides of the vehicle gradually increase as time elapses (from fourth to sixth distributions). In the drawing, the inner side of the vehicle refers to the right-hand side in a drawing showing a single contact length distribution, and the outer side of the vehicle refers to the left-hand side in the single drawing.

In each of FIGS. 5B through 5E, a portion of the contact length distribution shown in FIG. 5A is extracted in order to clearly show the contact length distribution shown in FIG. 5A. In FIG. 5B, the contact lengths on the outer side and the inner side (shoulder side) and the contact length at the center position C of the contact length distribution shown in FIG. 5A are extracted. In FIG. 5C, the contact lengths on the outer side and the inner side (shoulder side) of the contact length distribution shown in FIG. 5A are extracted. In FIG. 5D, the contact lengths on both neighboring sides of the center position C of the contact length distribution shown in FIG. 5A are extracted. In FIG. 5E, the contact length at the center position C is added to the contact lengths as shown in FIG. 5D.

As can be seen from FIGS. 5A through 5E, the contact lengths on the outer and inner side substantially expand after the starting of the braking, and, above all, the contact length on the inner side of the vehicle expands greatly. This is due to the fact that, as a result of the braking operation, the load applied to the front tires increases, and that, due to this increase in load, the wheel attitude tends to be of negative camber and toe-out through a suspension link mechanism. On the other hand, due to the increase in load, the contact length on the outer side of the vehicle increases. However, due to the tendency toward negative camber and toe-out, the contact length tends to decrease. As a result, the increase in contact length due to the increase in load is compensated for, with the result that the increase in contact length as a whole is lower as compared with that on the inner side of the vehicle.

Figure 6A:
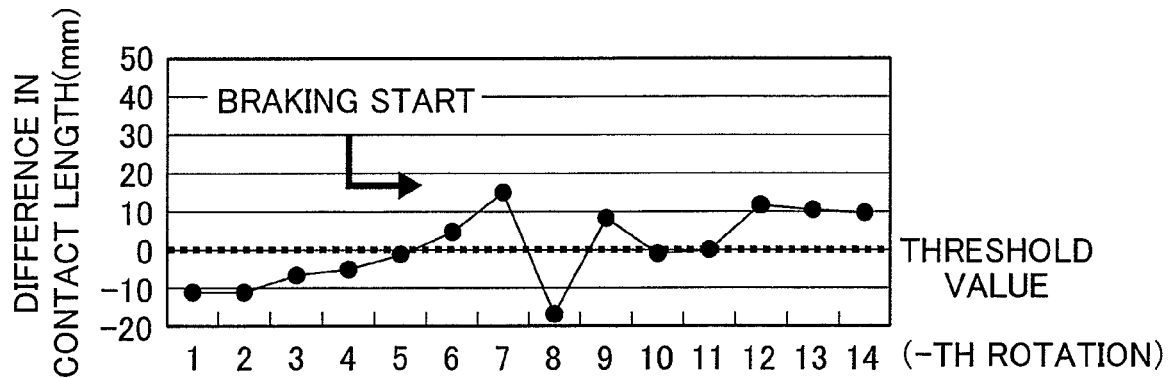
FIGS. 6A and 6B are graphs showing progression of a difference in contact length between two positions of the tire tread.

FIG. 6A is a graph showing, using the contact length data shown in FIG. 5A, chronological progression in the difference obtained by subtracting the contact length at the center position C from the contact length at the off-center position S situated on the inner side of the vehicle. The horizontal axis of the graph indicates the tire rotations. As can be seen from the graph, the braking starts upon the fourth rotation, with which the difference in contact length increases. The variation in the difference from the eighth rotation onward is due to the influence of an antilock brake system (ABS).

Figure 7:
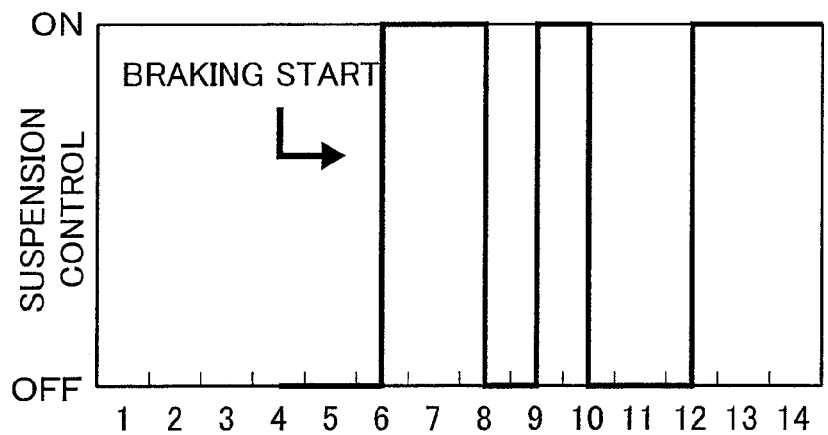
FIG. 7 is a diagram showing an example of a control signal generated in the wheel attitude control device of the present invention.

In this embodiment, when the difference in contact length exceeds "0", a control signal for turning on the vehicle attitude control is generated. That is, the control judgment portion 20 sets the first threshold value as "0", and makes a judgment as to whether the difference obtained by subtracting the contact length at the center position C from the contact length at the off-center position S on the inner side of the vehicle exceeds the first threshold value, which, in this example, is "0". The control judgment portion 20 generates the control signal such that, as shown in FIG. 7, the suspension control is turned on when the difference exceeds "0", and that the suspension control is turned off when the difference is not more than "0".

Figure 6B:
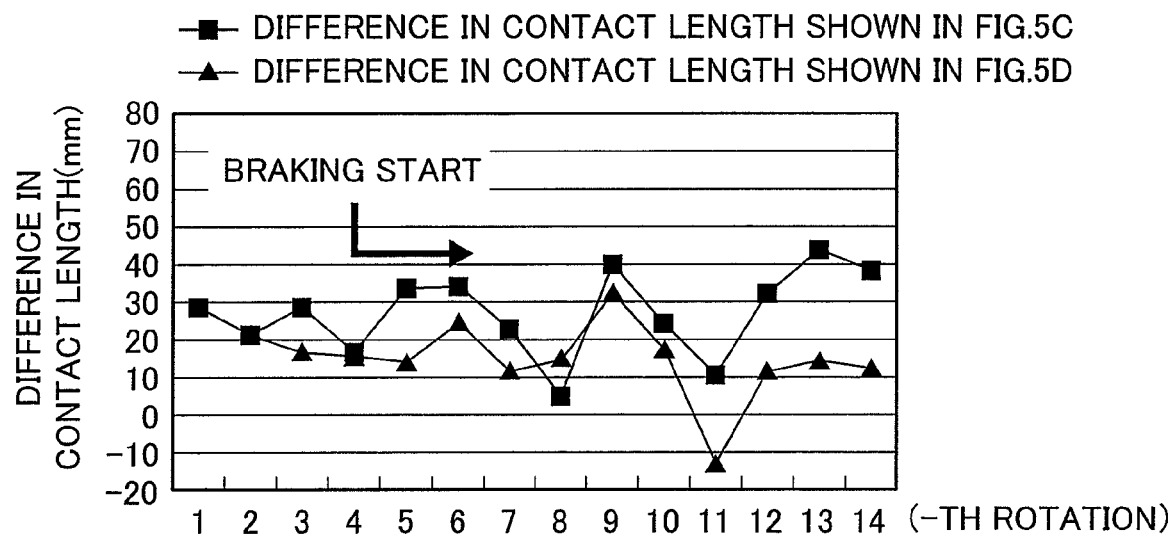

FIG. 6B is a graph showing chronological progression in the difference in contact length other than that of FIG. 6A obtained by using the contact length data shown in FIG. 5A. There are shown the difference in contact length shown in FIG. 5C (■), and the difference in contact length shown in FIG. 5D (▲). In contrast to the difference shown in FIG. 5A, those differences show no distinct tendency.

Thus, as shown in FIG. 6A, in the present invention, it is necessary to use a difference in contact length with a distinct tendency in its chronological progression. That is, in the present invention, there is used a difference obtained by subtracting the contact length at the center position C from the contact length at the off-center position S situated on the inner side of the vehicle.

In this way, after the braking operation is started, suspension control is performed in accordance with the above-mentioned difference in contact length, whereby the contact patch shape is caused to approximate the contact patch shape at the time of non-braking operation in which high braking force can be exerted.

While in this embodiment the difference in contact length is used for the judgment in the control judgment portion 20, it is also possible, in the present invention, for the object of judgment to be the ratio of the contact length at the off-center position S situated on the inner side of the vehicle to the contact length at the center position C, and, a control signal may be generated such that the suspension control is turned on when this ratio exceeds a second threshold value, and that the suspension control is turned off when it is not more than the second threshold value. Further, apart from the above difference and ratio, it is also possible to use as the object of judgment a value obtained through four arithmetic operations of the contact length at the off-center position S situated on the inner side of the vehicle and the contact length at the center position C.

Figure 8:
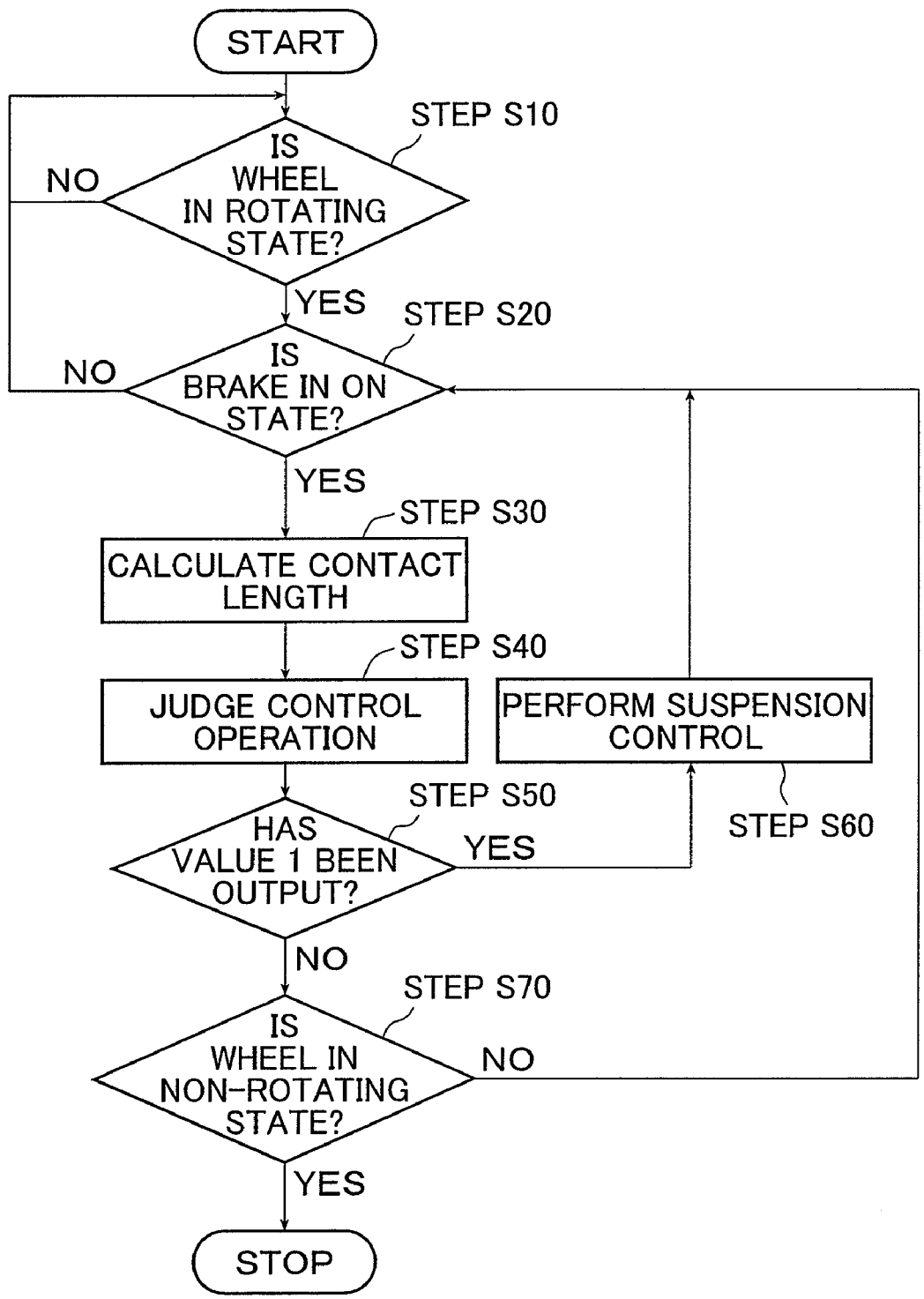
FIG. 8 is a flowchart showing procedures of a wheel attitude control method according to an embodiment of the present invention.

In the following, a wheel attitude control method using the wheel attitude control device 10 is described. FIG. 8 is a flowchart illustrating the wheel attitude control method.

First, in the contact length calculating portion 18, a judgment is made as to whether the wheel is in a rotation or non-rotation state (step S10). The judgment as to whether a rotation or non-rotation state of the wheel is made on the basis of pulse signals supplied from the wheel speed sensor provided in the vicinity of a hub to which the wheel is attached. An extremely-low-speed state (e.g., 10 km/h or less) is judged to be non-rotation, and hence when the number of pulse signals supplied within a predetermined period of time is not more than a fixed number, the wheel is judged to be in a non-rotation state.

Step S10 is repeated until it is determined that the wheel is rotating. When it is determined that the wheel is rotating, a judgment is further made in the contact length calculating portion 18 as to whether the braking operation is ON or not (step S20). The judgment as to whether the braking operation is ON or not is made on the basis of the presence/absence of the detection signal from the brake sensor 13. When the braking operation is not ON, the procedure returns to step S10, and the procedures of steps S10 and S20 are repeated as a standby state.

When it is determined that the braking operation is ON, that is, when the detection signal is supplied from the brake sensor 13, the contact length at the center position C and the contact length at the off-center position S are calculated in the contact length calculating portion 18 (step S30). When the wheel is in the rotation state, acceleration data is constantly supplied to the contact length calculating portion 18 from the data obtaining portion 16. The calculation of the contact length is conducted by using the supplied acceleration data. The method of calculating the contact length is as described above.

Next, in the control operation judgment portion 20, a judgment regarding a suspension control operation is made (step S40). The difference between the contact length at the center position C and the contact length at the off-center position S is calculated, and is compared with the first threshold value. When the difference is larger than the first threshold value, the value "1" is output as a control signal, and, when the difference is equal to or smaller than the first threshold value, the value "0" is output as a control signal. FIG. 7 shows an example of the control signal. This control signal is supplied to the suspension control device 14.

The suspension control device 14 makes a judgment as to whether the control signal is "0" or "1" (step S50). When the value is "1", suspension control is started (step S60). When the value is "0", no suspension control is conducted, and the device is placed in a standby state. In this case, a judgment is made as to whether the wheel has been placed in the non-rotation state through brake operation (step S70). When the wheel is in the non-rotation state, the control is completed. When the wheel is in the rotation state, the procedure returns to step S20, and the procedures of steps S20 through S70 are repeated.

In this way, after braking operation is started, the wheel attitude is controlled through suspension control based on the difference in contact length. At this time, the tire contact patch shape is caused to approximate the contact patch shape during non-braking operation, in which high braking force can be exerted.

The present invention is not restricted to the above-mentioned embodiments of the wheel attitude control method and the wheel attitude control device, and various improvements and modifications are naturally possible without departing from the gist of the present invention.

What is claimed is:

1. A wheel attitude control method for controlling an attitude of a wheel when braking a vehicle by imparting a braking force to the wheel attached to the vehicle, the method comprising the steps of:
chronologically obtaining acceleration data in a radial direction of a tire at a center position of a tire tread and at an off-center position spaced apart from the center position toward a shoulder on a vehicle inner side of the tire;
imparting the braking force to the wheels attached to the vehicle;
obtaining respective contact lengths at the center position and the off-center position until a speed of the wheel detected by a wheel speed sensor is lowered to a given value from the braking force imparted to the wheel based on a leading edge peak value $V_1$ and a trailing edge peak value $V_2$ detected from the acceleration data, the leading edge peak value $V_1$ referring to a value of a leading edge peak $P_1$ where an acceleration first attains its maximum level during one rotation of the wheel, the trailing edge peak value $V_2$ referring to a value of a trailing edge peak $P_2$ where after the leading edge peak $P_1$, from a temporary reduction in the value of the acceleration, the acceleration again attains another maximum value;

calculating a difference or a ratio between the obtained contact length at the center position and the obtained contact length at the off-center position, comparing the calculated difference with a pre-set first threshold value or comparing the calculated ratio with a pre-set second threshold value, and controlling a wheel attitude, which varies in accordance with changes in a load applied to the wheel, based on the calculated difference or the calculated ratio in contact length when the calculated difference exceeds the first threshold value or the calculated ratio exceeds the second threshold so that a contact patch shape of the tire is caused to approximate a contact patch shape at the time of imparting no braking force, until the speed of the wheel detected by the wheel speed sensor is lowered to the given value.

2. The wheel attitude control method according to claim 1, wherein the wheel attitude is controlled by controlling a camber angle or a toe angle of the wheel is controlled in the wheel attitude controlling step.

3. The wheel attitude control method according to claim 1, wherein the off-center position is situated within a range of 25% of a tire contact width as measured from a contact width end in a tire width direction.

4. A wheel attitude control device for controlling an attitude of a wheel when braking a vehicle by imparting a braking force to the wheel attached to the vehicle, the device comprising:

acceleration data obtaining means for chronologically obtaining acceleration data in a radial direction of a tire at a center position of a tire tread and at an off-center position spaced apart from the center position toward a shoulder on a vehicle inner side of the tire;

a brake sensor to trigger calculation of contact lengths;

a wheel speed sensor to detect a wheel speed;

contact length obtaining means for obtaining respective contact lengths at the center position and the off-center position until a speed of the wheel detected by the wheel speed sensor is lowered to a given value from the braking force imparted to the wheel based on a leading edge peak value $V_1$ and a trailing edge peak value $V_2$ detected from the acceleration data, the leading edge peak value $V_1$ referring to a value of a leading edge peak $P_1$ where an acceleration first attains its maximum level during one rotation of the wheel, the trailing edge peak value $V_2$ referring to a value of a trailing edge peak $P_2$ where after the leading edge peak $P_1$, from a temporary reduction in the value of the acceleration, the acceleration again attains another maximum value;

control judgment means for calculating a difference or a ratio between the obtained contact length at the center position and the obtained contact length at the off-center position and comparing the calculated difference with a pre-set first threshold value or comparing the calculated ratio with a pre-set second threshold value, and control signal generating means for generating a control signal for controlling the wheel attitude, which varies in accordance with changes in a load applied to the wheel, based on the calculated difference or the calculated ratio in contact length when the calculated difference exceeds the first threshold value or the calculated ratio exceeds the second threshold in accordance with result of the comparison by the control judgment so that a contact patch shape of the tire is caused to approximate a contact patch shape at the time of imparting no braking force until the speed of the wheel detected by the wheel speed sensor is lowered to the given value.

* * * * *